US010444598B1

(12) United States Patent
Heo (10) Patent No.: US 10,444,598 B1
(45) Date of Patent: Oct. 15, 2019

(54) CAMERA MODULE AND PORTABLE ELECTRONIC DEVICE

(71) Applicant: Samsung Electro-Mechanics Co., Ltd., Suwon-si (KR)

(72) Inventor: Chang Jae Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/398,335

(22) Filed: Apr. 30, 2019

(30) Foreign Application Priority Data

Jul. 9, 2018 (KR) .......................... 10-2018-0079429

(51) Int. Cl.
| | |
|---|---|
| *H04N 5/225* | (2006.01) |
| *G03B 5/00* | (2006.01) |
| *G03B 13/36* | (2006.01) |
| *G02B 27/64* | (2006.01) |
| *G02B 7/09* | (2006.01) |
| *G03B 13/02* | (2006.01) |

(52) U.S. Cl.
CPC ............... *G03B 5/00* (2013.01); *G02B 7/09* (2013.01); *G02B 27/646* (2013.01); *G03B 13/02* (2013.01); *G03B 13/36* (2013.01); *H04N 5/2252* (2013.01); *H04N 5/2253* (2013.01); *H04N 5/2254* (2013.01); *H04N 5/22525* (2018.08); *G03B 2205/0015* (2013.01); *G03B 2205/0076* (2013.01)

(58) Field of Classification Search
CPC .............................. G03B 5/00; H04N 5/22525
USPC ....................................................... 348/208.7
See application file for complete search history.

(56) References Cited

U.S. PATENT DOCUMENTS

| | | | |
|---|---|---|---|
| 8,570,384 B2 | 10/2013 | Brown | |
| 9,137,429 B2 | 9/2015 | Topliss et al. | |
| 2014/0009675 A1* | 1/2014 | Chiu | H04N 5/2253 348/374 |
| 2017/0289455 A1 | 10/2017 | Hu et al. | |

FOREIGN PATENT DOCUMENTS

JP      2017-207734 A      11/2017

* cited by examiner

*Primary Examiner* — Joel W Fosselman
(74) *Attorney, Agent, or Firm* — NSIP Law (57) ABSTRACT

A camera module includes a housing having an internal space, a first moving body disposed in the internal space of the housing, a second moving body disposed in an internal space of the first moving body, a driving wire for OIS formed of a shape memory alloy, and having both ends connected to the housing and a central portion connected to the first moving body, and a driving wire for AF formed of a shape memory alloy, and having both ends connected to the first moving body and a central portion connected to the second moving body. The driving wire for OIS includes a pair of driving wires for OIS disposed opposing each other configured to move the first moving body in one axis direction, and the driving wire for AF includes a pair of the driving wires for AF disposed on one side surface among internal surfaces of the first moving body spaced apart from each other upwardly and downwardly configured to move the second moving body in an upward direction and a downward direction.

19 Claims, 9 Drawing Sheets

CAMERA MODULE AND PORTABLE ELECTRONIC DEVICE

CROSS-REFERENCE TO RELATED APPLICATIONS

This application claims the benefit under 35 U.S.C. 119(a) of Korean Patent Application No. 10-2018-0079429 filed on Jul. 9, 2018, in the Korean Intellectual Property Office, the entire disclosure of which is incorporated herein by reference for all purposes.

BACKGROUND

1. Field

This application relates to a camera module and portable electronic device.

2. Description of the Background

Recently, camera modules (cameras) have been employed in portable electronic devices such as mobile terminals, smartphones, tablet PCs, laptops, and the like, and the cameras used in the portable electronic devices include an autofocusing (AF) function, an optical image stabilizing (OIS) function, a zoom function, and the like.

To implement a variety of functions, however, a structure of a camera module may become complex, and a size of a camera module may also be increased, such that a size of a portable electronic device in which a camera module is mounted may need to be increased as well.

With the growth of the smartphone camera market, there have been continuous attempts to reduce and integrate functions of a general-purpose camera, such as an autofocusing (AF) function, an optical zoom function, and the like, as well as an OIS driving method, and diverse structures of a camera module have been developed. Accordingly, this application recognizes a demand for an OIS driving method different from a general OIS method.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a first moving body disposed in an internal space of the housing, a second moving body disposed in the internal space of the first moving body, a driving wire for OIS formed of a shape memory alloy, and having both ends connected to the housing and a central portion connected to the first moving body, and a driving wire for AF formed of a shape memory alloy, and having both ends connected to the first moving body and a central portion connected to the second moving body. The driving wire for OIS includes a pair of driving wires for OIS disposed opposing each other configured to move the first moving body in one axis direction, and the driving wire for AF includes a pair of the driving wires for AF disposed on one side surface among internal surfaces of the first moving body spaced apart from each other upwardly and downwardly configured to move the second moving body in an upward direction and a downward direction.

The pair of driving wires for OIS may include a first pair of a first driving wire for OIS connected to one side surface of the first moving body and a second driving wire for OIS opposing the first driving wire for OIS, and a second pair of a third driving wire for OIS connected to a side surface adjacent to the one side surface of the moving body and a fourth driving wire for OIS opposing the third driving wire for OIS.

The housing may include first fixed connectors extending from four respective corners to an upper portion, and each end of the driving wire for OIS may be fixed to a corresponding first fixed connector.

First mounting ports for connection with the driving wire for OIS may be disposed on four side surfaces among external surfaces of the first moving body.

The first mounting ports may be disposed in central portions of side surfaces of the first moving body.

The pair of driving wires for AF may include a first driving wire for AF connected to an upper end of a side surface of the second moving body and a second driving wire for AF disposed in a lower portion of the first driving wire for AF.

Second fixed connectors to which corresponding ends of the driving wires for AF are connected may be disposed on one side surface among internal surfaces of the first moving body.

Second mounting ports to which the corresponding driving wires for AF are connected may be disposed on an external surface of the second moving body.

A second mounting port of the second mounting ports may be disposed in an upper portion and another second mounting port of the second mounting ports is disposed in a lower portion of one side surface of the second moving body.

An insertion groove opposing the second mounting ports may be formed on an internal surface of the first moving body.

The camera module may be a portable electronic device, further including an image sensor configured to convert light incident through a lens disposed in the second moving body to an electrical signal, and a display unit disposed on a surface of the portable electronic device to display an image based on the electrical signal.

The camera module may be a portable electronic device, further including an image sensor configured to convert light incident through a lens disposed in the second moving body to an electrical signal, and a display unit disposed on a surface of the portable electronic device to display an image based on the electrical signal.

In another general aspect, a camera module includes a housing having an internal space, a first moving body disposed in an internal space of the housing, a second moving body disposed in an internal space of the first moving body, a driving wire for OIS formed of a shape memory alloy, and having both ends connected to the housing and a central portion connected to the first moving body, and a driving wire for AF formed of a shape memory alloy, and having both ends connected to the first moving body and a central portion connected to the second moving body. The driving wires for OIS include a plurality of the driving wires for OIS disposed at the same height with reference to a bottom surface of the first moving body, and the driving wire for AF includes a plurality of driving wires for AF spaced apart from each other upwardly and downwardly and disposed on one side surface among internal surfaces of the first moving body.

In another general aspect, a camera module includes a housing having an internal space, a first moving body disposed in the internal space of the housing, a second moving body disposed in an internal space of the first moving body, a driving wire for OIS of shape memory alloy, and having both ends connected to the housing and a central portion connected to the first moving body, and a pair of driving wires for AF of shape memory alloy, disposed on an internal side surface of the first moving body spaced apart from each other upwardly and downwardly and each having both ends connected to the first moving body and a central portion connected to the second moving body.

Each end of the driving wire for OIS may be fixed to a corresponding first fixed connector portion extending from a respective corner to an upper portion of the housing.

The central portion of the driving wire for OIS may be fixed to a first mounting port disposed on an external side surface of the first moving body.

Each end of each driving wire for AF may be fixed to a respective second fixed connector disposed on an internal side surface of the first moving body.

Each central portion of each driving wire for AF may be connected to a respective second mounting port disposed on an external surface of the second moving body.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

An aspect of the present disclosure is to provide a lightweight camera module which may reduce manufacturing costs and may simplify manufacturing processes.

Figure 1:
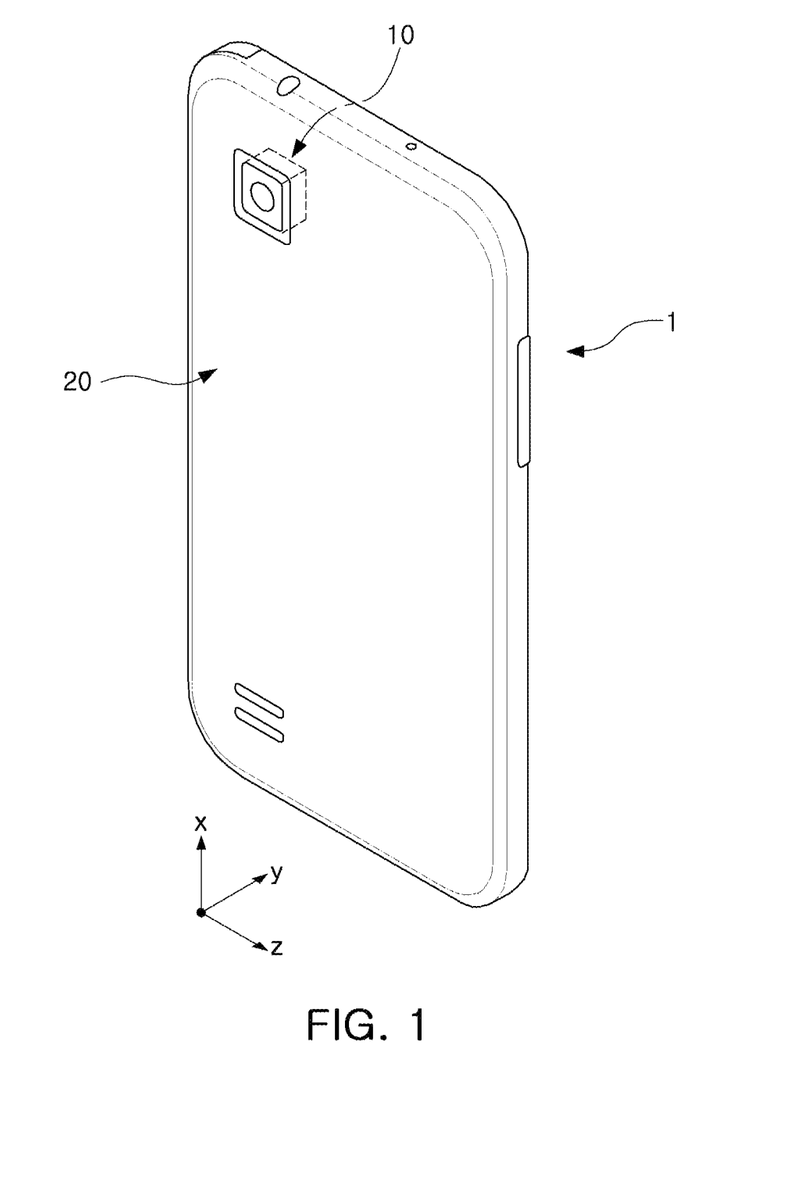
FIG. 1 is a perspective diagram illustrating a portable electronic device according to one or more examples.

FIG. 1 is a perspective diagram illustrating a portable electronic device according to one or more examples.

Referring to FIG. 1, a portable electronic device 1 according to an example may be implemented as a mobile communications terminal, a smartphone, a tablet PC, a wearable device such as a smartwatch, a vehicle mounted device, and the like, in which a camera module 10 is mounted.

As illustrated in FIG. 1, the portable electronic device 1 may include the camera module 10 to image a subject.

In the present example, the camera module 10 may include a plurality of lenses, and an optical axis of a lens may be oriented in a thickness direction (a Y axis direction, a direction towards a rear surface of the portable electronic device 1 from a front surface or the opposite direction) of the portable electronic device 1.

The portable electronic device 1, may further include a display unit 20, wherein the camera module 10 is installed as a front camera of the portable electronic device 10 along with the display unit 20 or as a back camera on a side of the portable electronic device 10 other than a side with the display unit 20. In an example, light incident through the lenses may impinge on an image sensor. An electrical signal converted by the image sensor of the camera module 10 may be output as an image via the display unit 20 of the portable electronic device 10.

In the camera module 10, an optical image stabilization (OIS) function or an autofocusing (AF) function may be executed by a driving wire for OIS 140 (see FIGS. 2 to 4) and a driving wire for AF 150 (see FIGS. 2 to 4), respectively, examples of which will be further described below.

Figure 2:
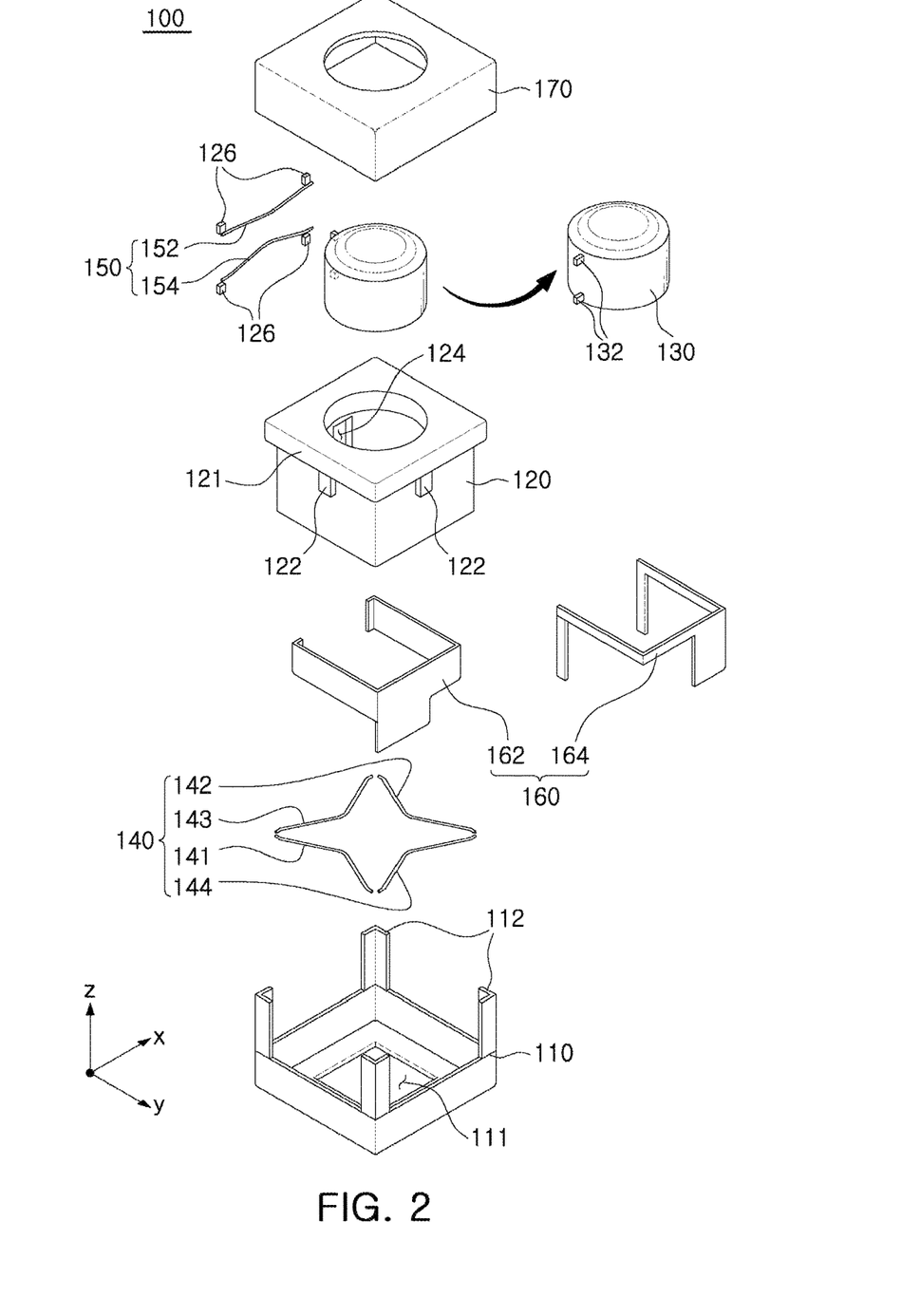
FIG. 2 is an exploded perspective diagram illustrating a camera module according to one or more examples.
Figure 3:
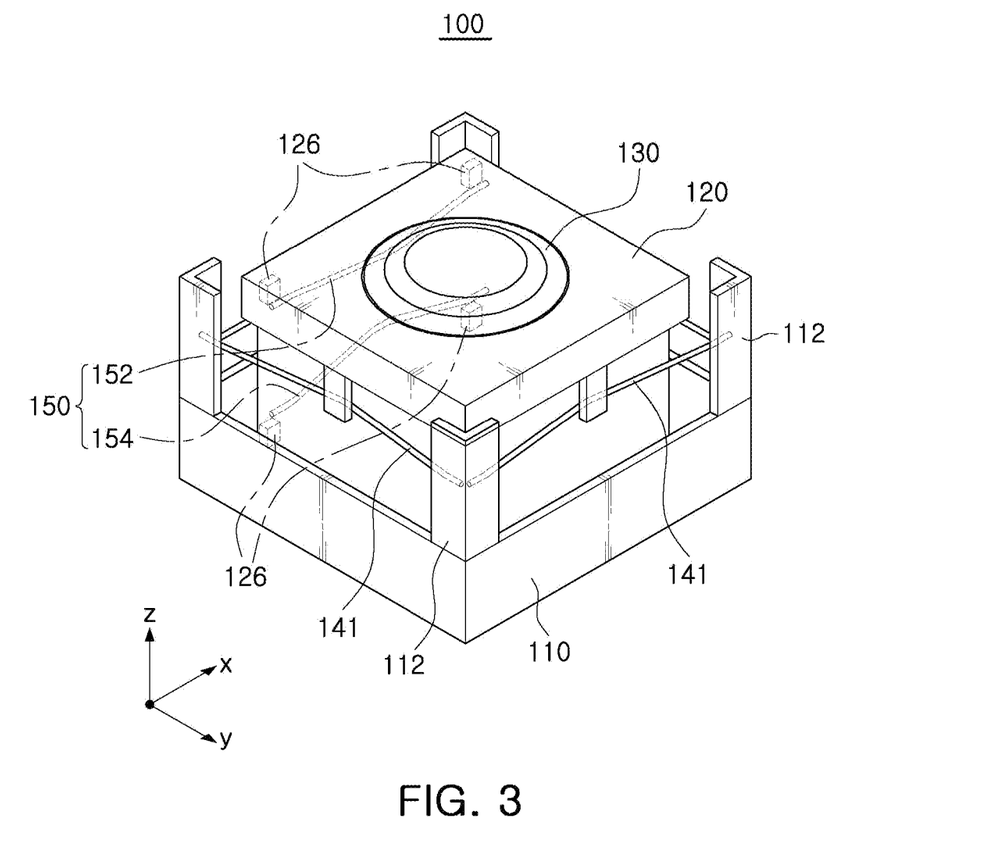
FIG. 3 is a schematic perspective diagram illustrating a camera module according to one or more examples.
Figure 4:
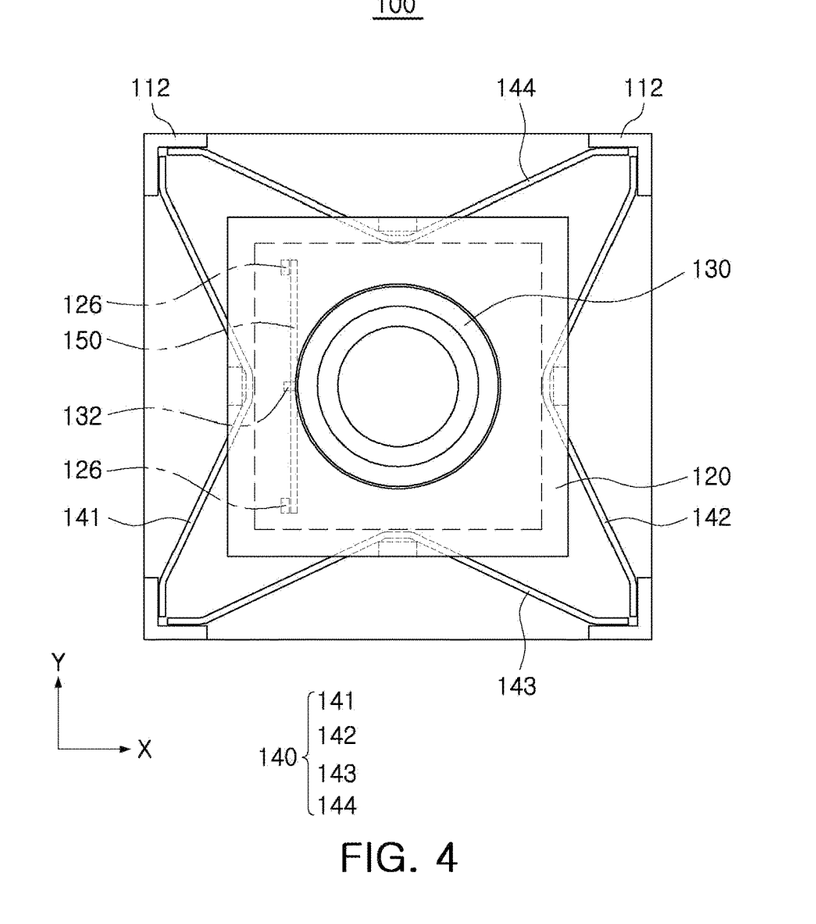
FIG. 4 is a diagram illustrating an installation state of a driving wire for OIS and a driving wire for AF according to one or more examples.

FIG. 2 is an exploded perspective diagram illustrating a camera module according to one or more examples. FIG. 3 is a schematic perspective diagram illustrating a camera module according to one or more examples. FIG. 4 is a diagram illustrating an installation state of a driving wire for OIS and a driving wire for AF according to one or more examples.

Referring to FIGS. 2 to 4, a camera module 100 in an example, may include a housing 110, a first moving body 120, a second moving body 130, a driving wire for OIS 140, a driving wire for AF 150, a flexible circuit substrate 160, and a shield case 170.

The housing 110 may have an internal space, and may have an approximately hexahedral shape. A through hole 111 may be formed in a bottom surface of the housing 110. First fixed connectors 112 extending to an upper portion may be provided on corners of the housing 110. Both ends of the driving wire for OIS 140 may be connected to the first fixed connectors 112. The first fixed connector 112 may be electrically connected to the flexible circuit substrate 160.

The first moving body 120 may be installed such that the first moving body 120 may move in an internal space of the housing 110. As an example, the first moving body 120 may move in two axis directions (e.g., an X axis and a Y axis) in an internal space of the housing 110. The first moving body 120 may have an approximately hexahedral shape. First mounting ports 122 for installation of the driving wire for OIS 140 may be provided on surfaces among external surfaces of the first moving body 120. The first mounting ports 122 may be disposed in central portions of side surfaces of the first moving body 120. The first mounting port 122 may extend from a stepped portion 121 disposed on an upper end of the first moving body 120.

An insertion groove 124 into which a second mounting port 132 of the second moving body 130 is inserted may be formed on an internal surface of the first moving body 120. A second fixed connector 126 for installation of the driving wire for AF 150 may be provided on one side among internal surfaces of the first moving body 120. Two second fixed connectors 126 may be disposed on an upper end of the first moving body 120, and the other two second fixed connectors 126 may disposed on a lower end.

The second moving body 130 may be installed in the first moving body 120 such that the second moving body 130 may move in one axis direction (e.g., a Z axis direction) with reference to the first moving body 120. As an example, a plurality of the second mounting ports 132 may be disposed on one side of the second moving body 130. Two second mounting ports 132 may be spaced apart from each other in a height direction (a Z axis direction) of the second moving body 130. The second mounting port 132 may be inserted into the insertion groove 124 of the first moving body 120 as described above.

One or more lenses (not illustrated) may be installed in the second moving body 130. For example, the one or more lenses may be disposed in the second moving body 130 along an optical axis in the Z axis direction.

The driving wire for OIS 140 may be formed of a shape memory alloy, and a plurality of the driving wires for OIS 140 may be provided. As an example, the driving wire for OIS 140 may be connected to four side surfaces among external surfaces of the first moving body 120. In other words, for example, the driving wire for OIS 140 may include first and second driving wires for OIS 141 and 142 for moving the first moving body 120 in one axis direction (an X axis direction), and third and fourth driving wires for OIS 143 and 144 for moving the first moving body 120 in another axis direction (a Y axis direction).

The first and second driving wires for OIS 141 and 142 may be disposed on side surfaces of the first moving body 120, respectively, and may be disposed to oppose each other. The third and fourth driving wires for OIS 143 and 144 may also be disposed on side surfaces of the first moving body 120, and may be disposed to oppose each other.

Both ends of the driving wire for OIS 140 may be installed in the first fixed connectors 112 of the housing 110, and a central portion may be connected to the first mounting port 122 of the first moving body 120. The driving wire for OIS 140 may be installed in the housing 110 and the first moving body 120 to have an approximately V shape. For example, both ends of each of the first, second, third, and fourth driving wires for OIS 141, 142, 143, and 144 may be installed in corresponding first fixed connectors 112 of the housing 110, and a central portion thereof may be connected to a corresponding first mounting port 122 of the first moving body 120. The first, second, third, and fourth driving wires for OIS 141, 142, 143, and 144 may each be installed in the housing 110 and the first moving body 120 to each have an approximately V shape.

In the description below, example methods of driving the first moving body 120 by the driving wire for OIS 140 will be described.

Figure 5:
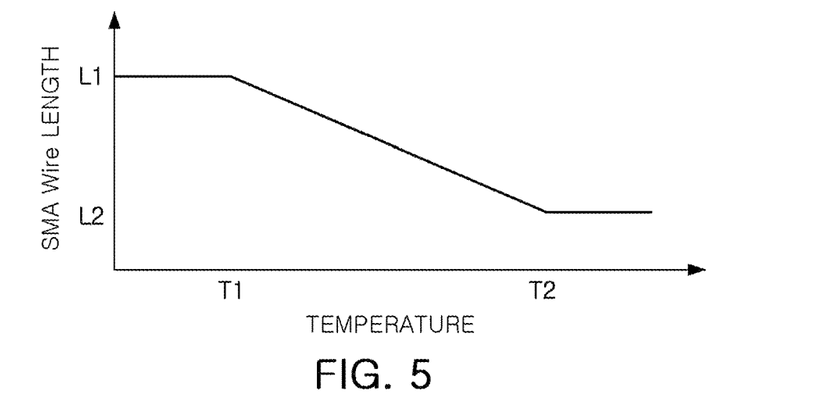
FIG. 5 is a graph illustrating a length of shape memory alloy depending on temperature.

As illustrated in FIG. 5, the driving wire for OIS 140 formed of a shape memory alloy may be configured such that the higher the temperature, the shorter the length of the driving wire for OIS 140. T1 and T2 in FIG. 5 may be higher than room temperature (25° C.), T1<T2, and L1 and L2, a length of the driving wire for OIS 140, may satisfy L1>L2.

L1 and L2, a length of the driving wire for OIS 140, may satisfy the equation below.

$$L2 = 0.978 \times L1 \qquad \text{Equation}$$

Figure 6:
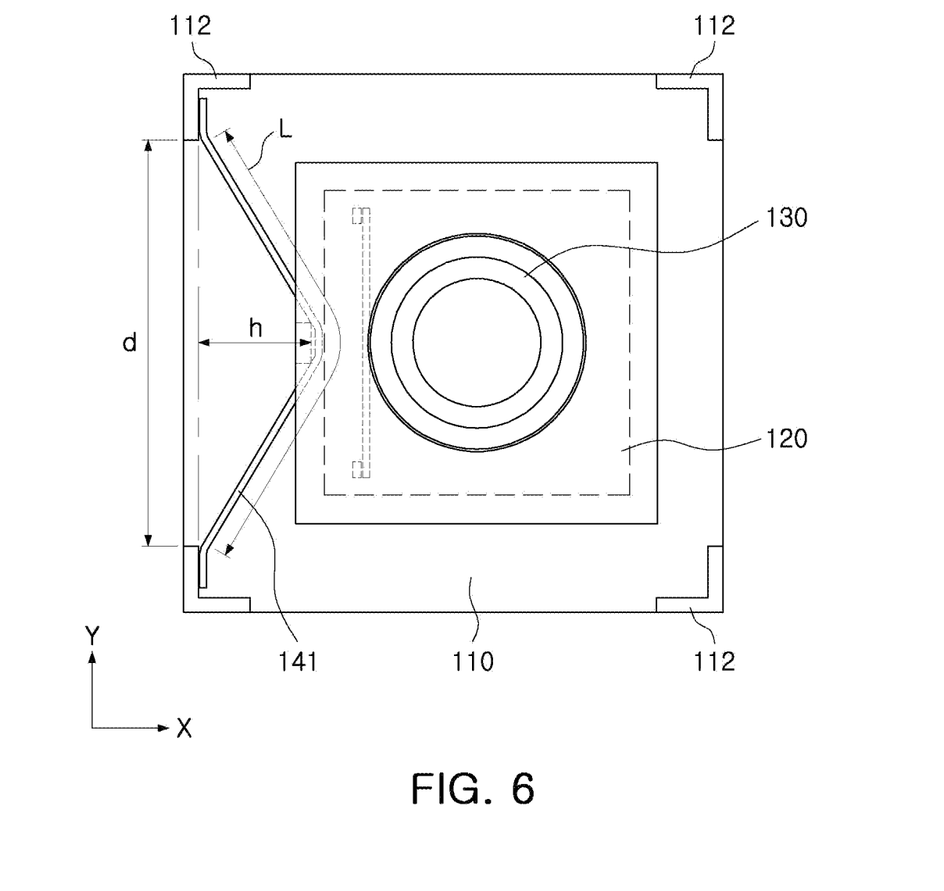
FIG. 6 is a diagram illustrating a stroke of a first moving body of a camera module according to one or more examples.

As illustrated in FIG. 6, when a distance between first fixed connectors 112 is d, a length of the driving wire for OIS 140 is L, and a distance between an internal surface of the housing 110 and an internal surface of the first mounting ports 122 is h, h may satisfy the equation below.

$$h = \{(L/2)2 - (d/2)2\}1/2 \qquad \text{Equation}$$

As an example, in a camera module including the housing 110 in which the distance d between the first fixed connectors 112 is 8.8 mm, and the length L1 of the driving wire for OIS 140 is 9.08 mm at room temperature, h may be obtained by the equation above. Also, when the driving wire for OIS 140 is elongated to the maximum length, h may have a maximum value, hmax, and hmax may be 1.12 mm. When the driving wire for OIS 140 is reduced to the minimum length, h may have a minimum value, hmin, and hmin may be 0.6 mm.

Thus, the first moving body 120 may have a stroke of 0.52 mm at the most while the driving wire for OIS 140 reduces and elongates.

Figure 7:
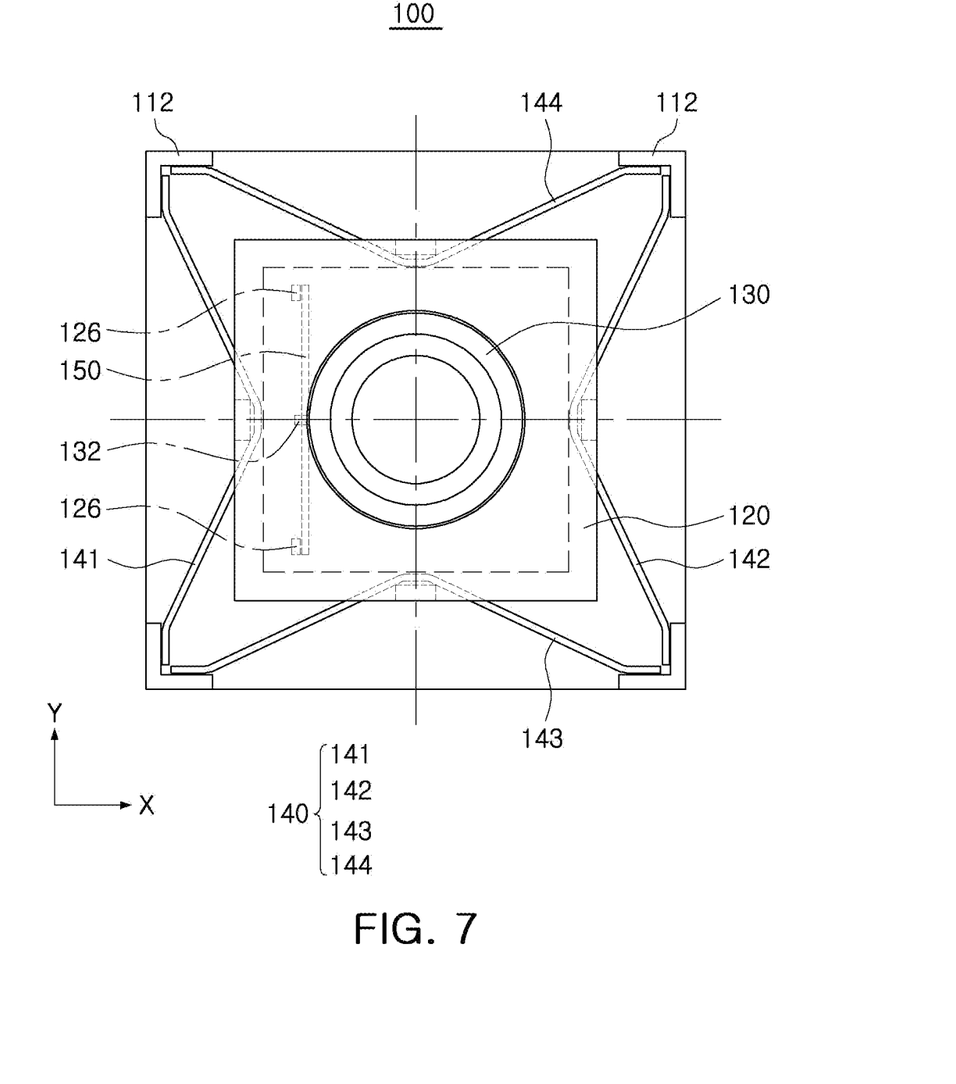
FIG. 7 is a diagram illustrating a state in which a first moving body of a camera module is disposed in a base position according to one or more examples.

When a certain amount of current flows to the first and second driving wires for OIS 141 and 142 for moving the first moving body 120 in an X axis direction and to the third and fourth driving wires for OIS 143 and 144 for moving the first moving body 120 in a Y axis direction, a center of the first moving body 120 and a center of the housing 110 may be disposed in the same position as illustrated in FIG. 7.

Figure 8:
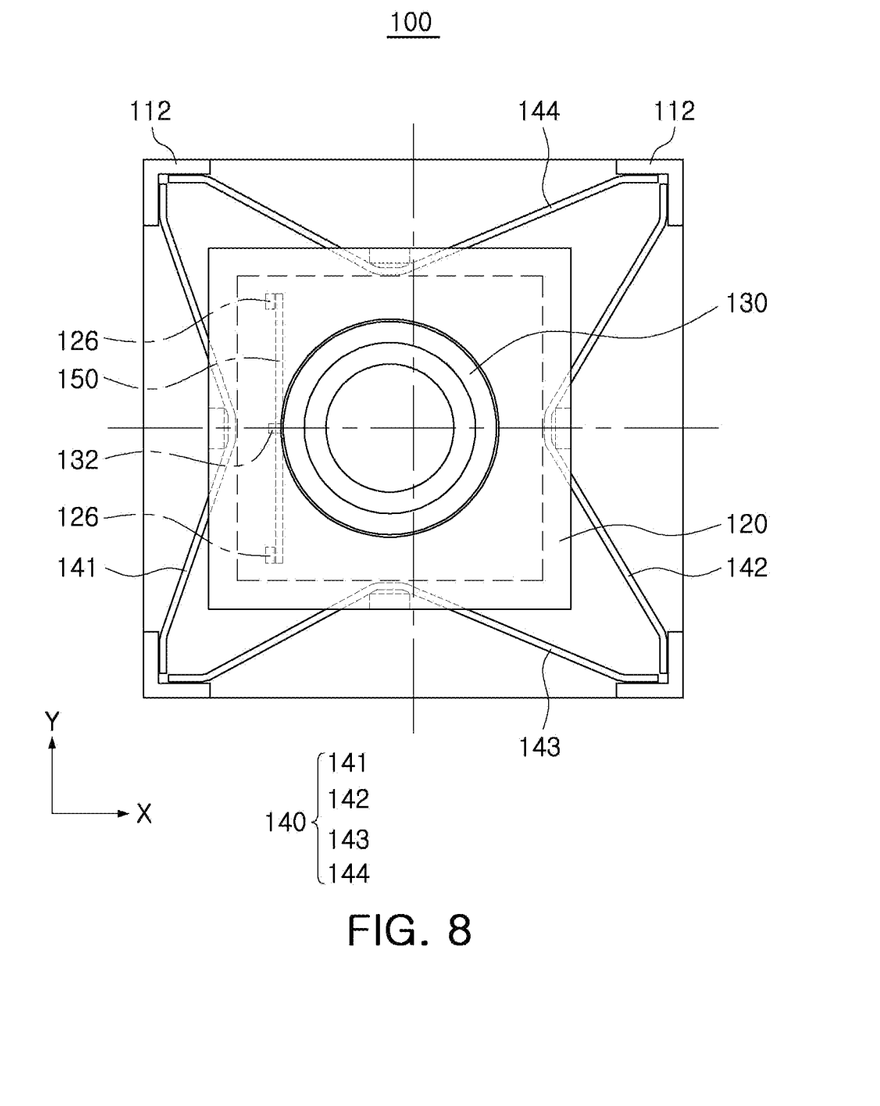
FIGS. 8 and 9 are diagrams illustrating a driving method of a first moving body of a camera module according to one or more examples.
Figure 9:
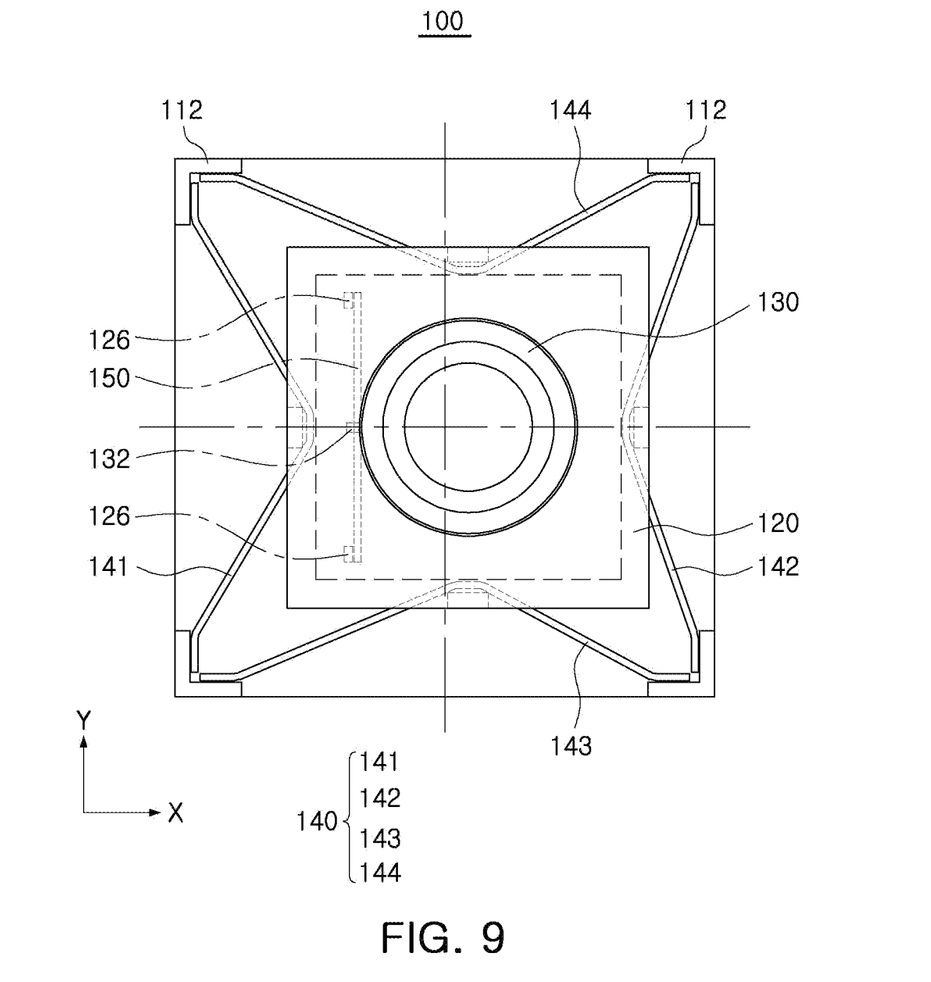

When the first driving wire for OIS 141 is reduced by increasing current provided to the first driving wire for OIS 141, and the second driving wire for OIS 142 is elongated by decreasing current provided to the second driving wire for OIS 142, a center of the first moving body 120 may move to the left side from a center of the housing 110 as illustrated in FIG. 8. When the first driving wire for OIS 141 is elongated by decreasing current provided to the first driving wire for OIS 141, and the second driving wire for OIS 142 is reduced by increasing current provided to the second driving wire for OIS 142, a center of the first moving body 120 may move to the right side from a center of the housing 110 as illustrated in FIG. 9.

Similarly to the method of reducing and elongating the first and second driving wires for OIS 141 and 142, the first moving body 120 may move in the Y axis direction by increasing and decreasing current supplied to the third and fourth driving wires for OIS 143 and 144.

In examples, the driving wire for OIS 140 may have one or more of the first, second, third, and fourth driving wires for OIS 141, 142, 143, and 144. For example, the driving wire for OIS 140 may have the first driving wire for OIS 141, the first and second driving wires for OIS 141 and 142, the third driving wire for OIS 143, the third and fourth driving wires for OIS 143 and 144, the first and third driving wires for OIS 141 and 143, the first, second, and third driving wires for OIS 141, 142, and 143, the first, third, and fourth driving wires for OIS 141, 143, and 144, or the first, second, third, and fourth driving wires for OIS 141, 142, 143, and 144.

The driving wire for AF 150 may move the second moving body 130 in a Z axis direction. As an example, the driving wire for AF 150 may be disposed only on one side surface among internal surfaces of the first moving body 120. A plurality of the driving wires for AF 150 may be provided. For example, a first driving wire for AF 152 and a second driving wire for AF 154 disposed in a lower portion of the first driving wire for AF 152 may be provided.

Both ends of the driving wire for AF 150 may be installed in the second fixed connector 126 of the first moving body 120, and a central portion of the driving wire for AF 150 may be connected to the second mounting port 132 of the second moving body 130. In other words, the driving wire for AF 150 may be installed in the first moving body 120 and the second moving body 130 to have an approximately V shape. For example, both ends of each driving wire for AF 152 and 154 may be installed in corresponding second fixed connectors 126 of the first moving body 120, and a central portion of each driving wire for AF 152 and 154 may be connected to a corresponding second mounting port 132 of the second moving body 130. The driving wires for AF 152 and 154 may each be installed in the first moving body 120 and the second moving body 130 to each have an approximately V shape.

With regard to a moving method of the second moving body 130 by the driving wire for AF 150, when a certain amount of current flows to the first driving wire for AF 152 and the second driving wire for AF 154, the second moving body 130 may be disposed in a base position. When the first driving wire for AF 152 is reduced by increasing current supplied to the first driving wire for AF 152, and the second driving wire for AF 154 is elongated by decreasing current supplied to the second driving wire for AF 154, the second moving body 130 may move to an upper portion. When the first driving wire for AF 152 is elongated by decreasing current supplied to the first driving wire for AF 152, and the second driving wire for AF 154 is reduced by increasing current supplied to the second driving wire for AF 154, the second moving body 130 may move to a lower portion.

Figure 10:
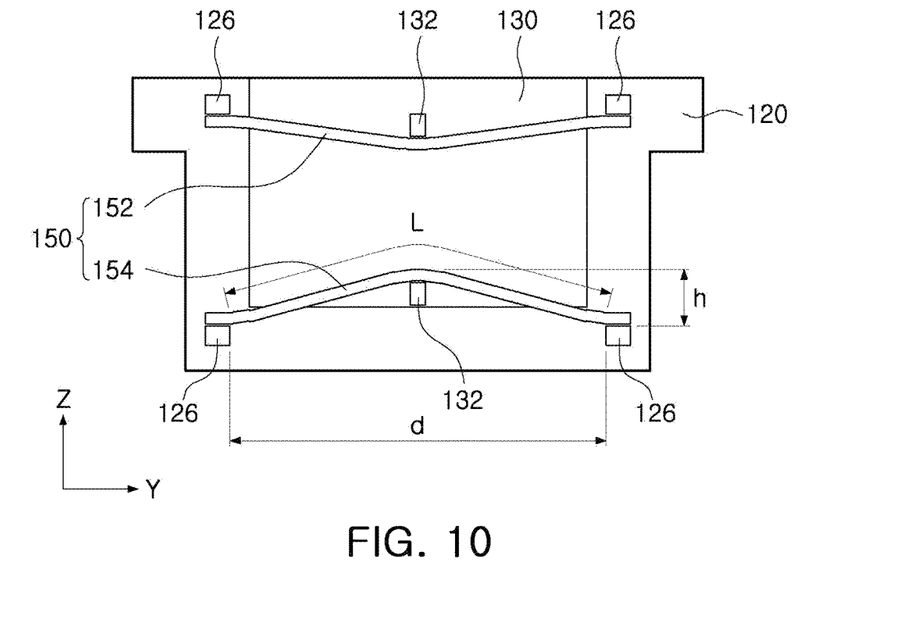
FIG. 10 is a diagram illustrating a stroke of a second moving body of a camera module according to one or more examples.

As illustrated in FIG. 10, a distance between the second fixed connectors 126 may be defined as d, a length of the driving wire for AF 150 may be defined as L, and a distance between the second fixed connector 126 and the second mounting port 132 may be defined as h. As an example, when the driving wire for AF 150 in which the distance d between the second fixed connectors 126 is 6.7 mm, and the length L1 at room temperature is 6.86 mm is employed, hmax may be 0.73 mm, and hmin may be 0.17 mm. Thus, a stroke in a Z axis direction of the second moving body 130 may be 0.56 mm.

As both of the first driving wire for AF 152 and the second driving wire for AF 154 are disposed on one side surface of the second moving body 130, an operation of ascending the second moving body 130 by the first driving wire for AF 152 and the second driving wire for AF 154 may be accurately controlled.

The flexible circuit substrate 160 may include a flexible circuit substrate for OIS 162 connected to the driving wire for OIS 140, and a flexible circuit substrate for AF 164 electrically connected to the driving wire for AF 150.

The shield case 170 may be formed of a metal material, and may prevent damages caused by external impacts. As an example, the shield case 170 may have a box shape in which a lower end is opened, and a through hole 172 may be formed on an upper surface. The shield case 170 may be coupled to the housing 110.

As described above, as an OIS function and an AF function may be implemented through the driving wire for OIS 140 and the driving wire for AF 150, the lightweight camera module 100 may be implemented.

Further, as an OIS function and an AF function may be implemented through the driving wire for OIS 140 and the driving wire for AF 150, a manufacturing process may be simplified. Also, manufacturing costs may be reduced by reduction in process time.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing comprising an internal space;
   a first moving body disposed in the internal space of the housing;
   a second moving body disposed in an internal space of the first moving body;
   a driving wire for OIS formed of a shape memory alloy, and comprising both ends connected to the housing and a central portion connected to the first moving body; and
   a driving wire for AF formed of a shape memory alloy, and comprising both ends connected to the first moving body and a central portion connected to the second moving body,
   wherein the driving wire for OIS comprises a pair of driving wires for OIS disposed opposing each other configured to move the first moving body in one axis direction, and
   wherein the driving wire for AF comprises a pair of the driving wires for AF disposed on one side surface among internal surfaces of the first moving body spaced apart from each other upwardly and downwardly configured to move the second moving body in an upward direction and a downward direction.

2. The camera module of claim 1, wherein the pair of driving wires for OIS comprises a first pair of a first driving wire for OIS connected to one side surface of the first moving body and a second driving wire for OIS opposing the first driving wire for OIS, and a second pair of a third driving wire for OIS connected to a side surface adjacent to the one side surface of the moving body and a fourth driving wire for OIS opposing the third driving wire for OIS.

3. The camera module of claim 1,
   wherein the housing comprises first fixed connectors extending from four respective corners to an upper portion, and
   wherein each end of the driving wire for OIS is fixed to a corresponding first fixed connector.

4. The camera module of claim 3, wherein first mounting ports for connection with the driving wire for OIS are disposed on four side surfaces among external surfaces of the first moving body.

5. The camera module of claim 4, wherein the first mounting ports are disposed in central portions of side surfaces of the first moving body.

6. The camera module of claim 1, wherein the pair of the driving wires for AF comprises a first driving wire for AF connected to an upper end of a side surface of the second moving body and a second driving wire for AF disposed in a lower portion of the first driving wire for AF.

7. The camera module of claim 6, wherein second fixed connectors to which corresponding ends of the driving wires for AF are connected are disposed on one side surface among internal surfaces of the first moving body.

8. The camera module of claim 7, wherein second mounting ports to which the corresponding driving wires for AF are connected are disposed on an external surface of the second moving body.

9. The camera module of claim 8, wherein a second mounting port of the second mounting ports is disposed in an upper portion and another second mounting port of the second mounting ports is disposed in a lower portion of one side surface of the second moving body.

10. The camera module of claim 9, wherein an insertion groove opposing the second mounting ports is formed in an internal surface of the first moving body.

11. A portable electronic device, comprising:
    the camera module of claim 1 further comprising an image sensor configured to convert light incident through a lens disposed in the second moving body to an electrical signal; and
    a display unit disposed on a surface of the portable electronic device to display an image based on the electrical signal.

12. A camera module, comprising:
    a housing comprising an internal space;
    a first moving body disposed in the internal space of the housing;
    a second moving body disposed in an internal space of the first moving body;
    a driving wire for OIS formed of a shape memory alloy, and comprising both ends connected to the housing and a central portion connected to the first moving body; and
    a driving wire for AF formed of a shape memory alloy, and having both ends connected to the first moving body and a central portion connected to the second moving body, wherein the driving wire for OIS comprises a plurality of the driving wires for OIS disposed at the same height with reference to a bottom surface of the first moving body, and wherein the driving wire for AF comprises a plurality of driving wires for AF spaced apart from each other upwardly and downwardly and disposed on one side surface among internal surfaces of the first moving body.

13. A portable electronic device, comprising:

the camera module of claim 12 further comprising an image sensor configured to convert light incident through a lens disposed in the second moving body to an electrical signal; and a display unit disposed on a surface of the portable electronic device to display an image based on the electrical signal.

14. A camera module, comprising:

a housing comprising an internal space;

a first moving body disposed in the internal space of the housing;

a second moving body disposed in an internal space of the first moving body;

a driving wire for OIS comprising shape memory alloy, and comprising both ends connected to the housing and a central portion connected to the first moving body; and a pair of driving wires for AF comprising shape memory alloy, disposed on an internal side surface of the first moving body spaced apart from each other upwardly and downwardly and each comprising both ends connected to the first moving body and a central portion connected to the second moving body.

15. The camera module of claim 14, wherein each end of the driving wire for OIS is fixed to a corresponding first fixed connector portion extending from a respective corner to an upper portion of the housing.

16. The camera module of claim 15, wherein the central portion of the driving wire for OIS is fixed to a first mounting port disposed on an external side surface of the first moving body.

17. The camera module of claim 14, wherein each end of each driving wire for AF is fixed to a respective second fixed connector disposed on an internal side surface of the first moving body.

18. The camera module of claim 17, wherein each central portion of each driving wire for AF is connected to a respective second mounting port disposed on an external surface of the second moving body.

19. A portable electronic device, comprising:

the camera module of claim 14 further comprising an image sensor configured to convert light incident through a lens disposed in the second moving body to an electrical signal; and a display unit disposed on a surface of the portable electronic device to display an image based on the electrical signal.

* * * * *